May 24, 1955           M. ALDEN           2,709,247
ELECTRICAL CONNECTORS
Filed March 7, 1950                            2 Sheets—Sheet 1
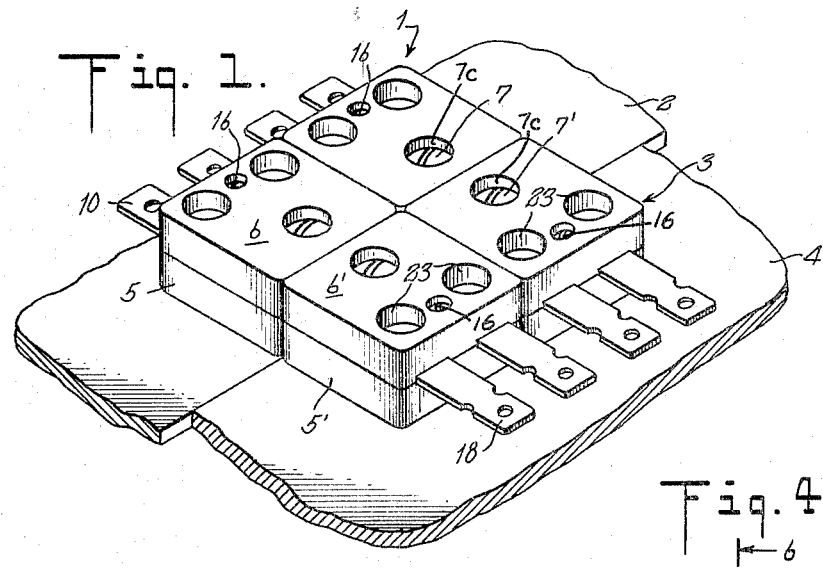
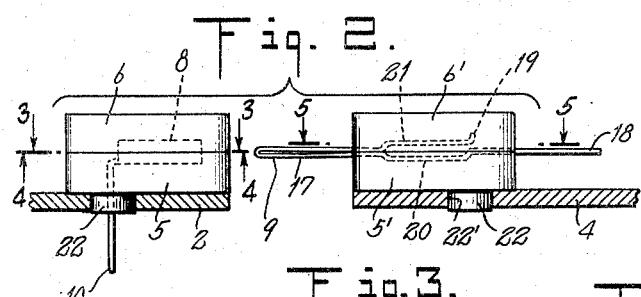 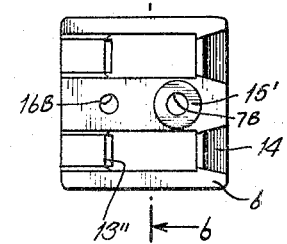
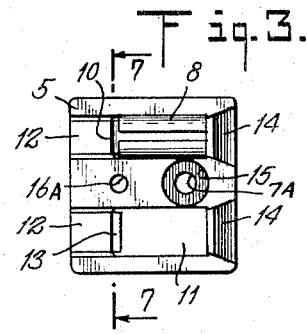 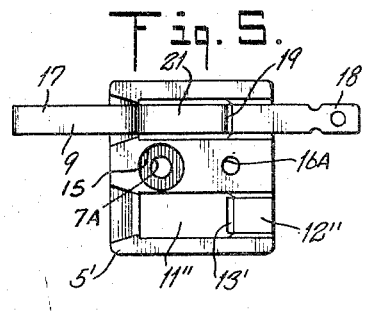
 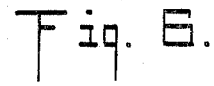
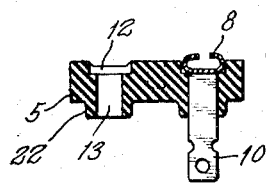 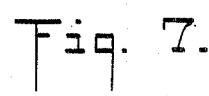
INVENTOR.
MILTON ALDEN
BY
ATTORNEY

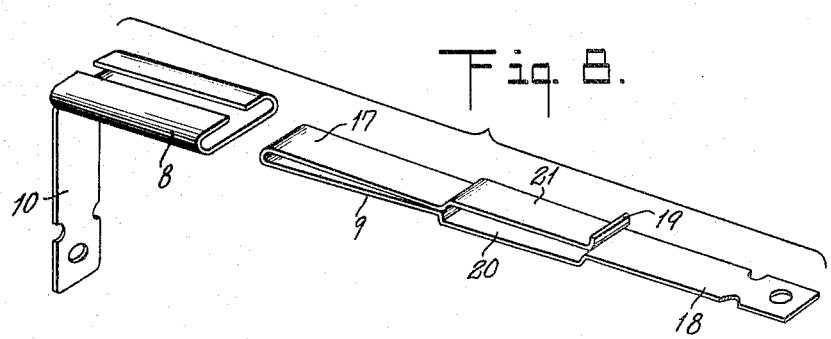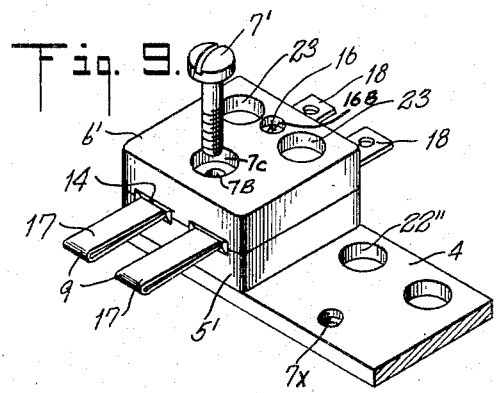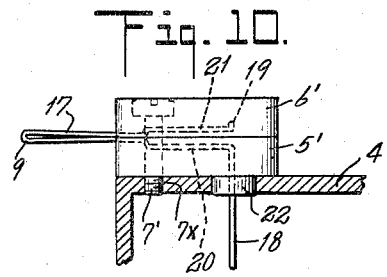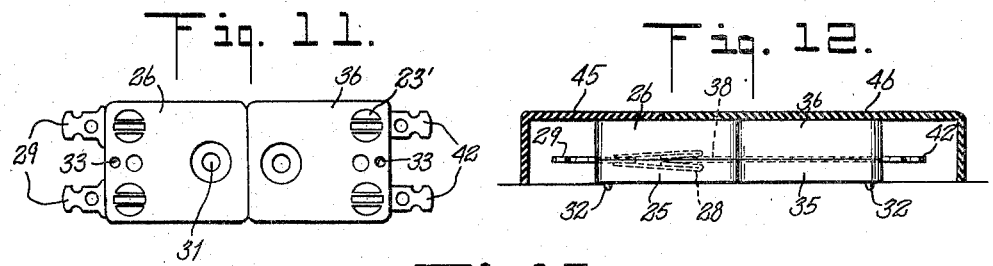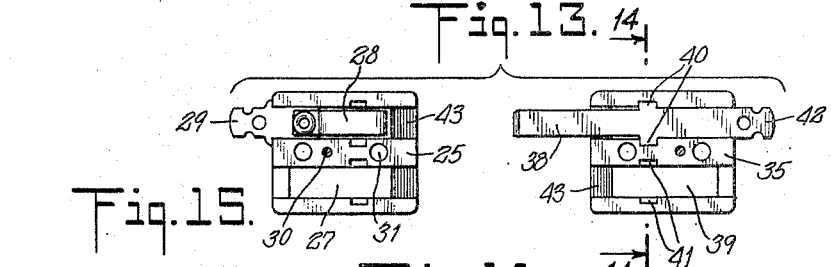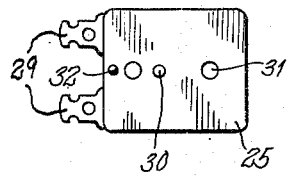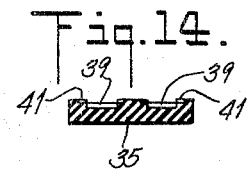
INVENTOR.
MILTON ALDEN
ATTORNEY

United States Patent Office 2,709,247
Patented May 24, 1955

2,709,247

ELECTRICAL CONNECTORS

Milton Alden, Brockton, Mass.

Application March 7, 1950, Serial No. 148,254

5 Claims. (Cl. 339—206)

My invention relates particularly to multiple connectors and parts thereof.

Modern plug-in, slide-in units involve complicated problems of wiring and frequently result in congested nests of wires and difficulty in connecting and disconnecting the elements.

I have accordingly discovered that by constructing the connectors in small special units and arranging them in banks it is possible to easily install the units in readily accessible relation.

Connectors can be mounted in different ways when desired, to allow for isolation of critical voltages or frequencies, to permit most direct wiring from connector to connector and to eliminate the rat nest wiring of conventional methods.

Units may be easily mounted by single screws, either flush or stacked and accessibly located.

By floatingly mounting the conductors and providing the female elements with wide funnel-like or bell mouths, I provide for wide mating tolerances and do away with critical alinement difficulties. By arranging all the wiring terminals of the stationary units in a common plane and all the wiring terminals of the sliding units in a separate plane, there is no confusion in checking the wiring. All leads can be instantly and accurately checked.

Each unit is provided with convenient means for color coding so that service checking is made most convenient and accurate.

By dividing the banks into small discrete units, the system provides a maximum elasticity for installation and maximum facilitating of operation.

For use with high voltages, removable insulating guards are provided which cover the wiring and conductors of each bank of units.

Fig. 1 is a perspective view showing a bank of connectors embodying my invention.

Fig. 2 is a side view of two elements separated, parts of the conductors being shown dotted.

Fig. 3 is a plan view of the inside of the base part of a connector element of Fig. 2 with one of the female conductors in place, the view being taken on the plane of the line 3—3 of Fig. 2.

Fig. 4 is a view of the underside of the companion top part of the connector of Fig. 2, the view being taken on the plane of the line 4—4 of Fig. 2.

Fig. 5 is a plan view of the inside of the base of the connector element of Fig. 2 with one of the male conductors in place, the view being taken on the plane of the line 5—5 of Fig. 2.

Figs. 6 and 7 are transverse sectional views of the top and base parts respectively of a connector body, the sections being taken on the planes of the lines 6—6 of Fig. 4 and lines 7—7 of Fig. 3.

Fig. 8 is a perspective view showing two conductor parts.

Fig. 9 is a perspective view showing a connector and supporting panel segment.

Fig. 10 is a side view of a connector part and showing a section of a supporting panel.

Fig. 11 is a plan view of two connectors of a modified form.

Fig. 12 is a side view of the connectors of Fig. 11 and showing guard plates.

Fig. 13 is a plan view showing the inside of the lower parts of the connectors of Fig. 11 separated.

Fig. 14 is a transverse sectional view taken on the plane of the line 14—14 of Fig. 13.

Fig. 15 is a bottom plan view of the base of Fig. 13.

A bank consisting of connector units 1, 1 is mounted on a supporting plate 2 and the companion bank of units 3, 3 is mounted on a plate 4. One of these plates with its connector units, for instance, the plate 2 may be regarded as the stationary element and the other plate 4 with its connector units may be regarded as the sliding part of the combination.

Each connector unit has a base part 5 or 5' and a top part 6 or 6' and is secured to its supporting plate by a screw 7 or 7'.

The conductor elements 8 and 9 are loosely or floatingly supported respectively in the units 1 and 3. The female element 8 has a wiring terminal 10 which may be bent at right angles as shown in Figs. 2 and 8 or may be extended in alinement with the contact socket portion as in Fig. 1.

The base part 5 of a connector unit has recesses 11, 11' adapted to receive contact socket portions of the conductor 8, 8'. Each base part also has a shallow recess 12 which may receive the wiring terminal 10 and base part 5 has a slot 13 adapted to receive the wiring terminal 10 in case the terminal is brought out at right angles to the plane of the base. At the other end of the base 5 and top 6 a bell mouth or funnel-like entrance 14 is provided leading to the contact containing recess 11 in alinement with the contact socket when the contact socket is in place.

The base is also provided with a recess 15 to receive the sleeve 15' which projects downward from the top piece 6, the purpose of this sleeve being to insulate the mounting screw 7 from the contact 8 and also to provide a recess 7C on the upper face of the top part to receive the head of the attaching screw 7 the body of which is located in the aligned holes 7A, 7B concentric with the recess 15 and with sleeve 15' respectively.

The base and top parts of the connector are secured together preferably by a screw shank rivet 16 which is driven into holes 16A in the molded parts 5, 5' aligned with holes 16B in the parts 6, 6'.

The male conductor element 9 is formed of a strip of metal folded at 17 to provide resiliency in its engagement with the socket part of the contact 8. The conductor 9 has a wiring terminal 18 at the end opposite to the contact end 17.

One end portion 19 of the conductor 9 is bent at right angles and adapted to be positioned in a recess or slot 13" (see Fig. 4). Part of the shank of the conductor 9 is positioned in the recess 12" (see Fig. 5) corresponding to the recess 12 previously described. Between the ends, the conductor portions 20 and 21 are offset as shown in Fig. 8 so as to provide enlargements adapted to fit in recesses 11".

The base part 5' may have a slot or recess 13' to receive the lug 19 or the top piece 6' may have a recess or slot of the same size to receive the lug 19 so that the conductor 9 may be located with the lug 19 facing upwardly or downwardly as the case may be.

Each of the base parts is provided with projecting bosses or projections 22 which are adapted to be positioned in openings or recesses 22' in the supporting plate 2 and this supporting plate is provided with a screw threaded seat 7x adapted to receive the supporting screw 7.

The sliding connectors are adapted to be similarly mounted on the plate 4.

Each of the top parts is provided with a recess 23 to bear code markings to facilitate wiring and checking the connections. These recesses also accommodate the bosses 22 when it is desired to stack one connection on another.

These recesses or depressions may be divided into a number of sections such as three as shown at 23' in Fig. 11 to allow for coding of wires having as many as three traces.

In the form shown in Figs. 11 to 15, inclusive, one connector part, consisting of the base 25 and the top 26, has recesses such as 27 in each part to accommodate a spring jaw 28 connected to a wiring terminal 29. These parts 25 and 26 are connected together by a rivet 30 and may be mounted on a base by means of a screw (not shown) in the passage 31.

To facilitate stacking and positioning the connectors, one part, for instance the bottom part, may have a projection 32 and the other part may have a complementary recess 33. These projections make it possible to mount each unit with a single screw.

The other connector having a base 35 and a top 36 is constructed similarly to that just described, but in this case the male conductor 38 is located in a recess 39 and has projecting lugs 40 which fit in recesses 41 at the sides of recess 39. This conductor 38 has a wiring terminal 42 which projects from the opposite end of the part 35.

To facilitate connection of the parts, the connector parts 25 and 26 are provided with flaring or bell mouth entrance passages 43.

It will be noted that each of the connectors is formed of two parts and that the stationary and sliding connectors are substantially interchangeable.

By constructing the stationary and sliding elements in the form of discrete units, it is possible to assemble and rearrange the connectors as occasion may require. It has also been found by arranging the connectors in discrete units, it is possible to obtain a greater flexibility in mounting.

It is also easier to connect and disconnect the parts. Wide mating tolerances eliminate critical unit alinement problems. The presence of the molded locating bosses positions and locates the connectors in place on the support when flush mounted and accurately lines up and positions the connectors together in a stack mounting.

According to this invention, the wiring terminals are easily accessible and uncongested for multiple contact wiring. Color coding on the back connectors identifies each lead for an instantaneous check to the respective circuits.

In cases where the back connectors are carrying high voltages I may provide insulating guards such as 45 and 46 extending across the respective units and covering the wiring and contact elements when "live" and held in place in any suitable manner.

In referring to stationary and movable connectors it should be understood that these terms are relative and in fact both sets of units may be movable with respect to a base or chassis.

Although for production reasons the same molded parts may be used to house the male and female conductors, it should be understood that the male parts do not need the funnel or bell-like entrance.

It should also be understood that screws may be used instead of rivets and vice versa for securing parts together.

I claim:

1. An electrical connector comprising two identical insulating casings, each of said casings being substantially rectangular and comprising upper and lower half portions of substantially equal height, each of said casings further being formed with an elongated conductor retaining recess extending longitudinally therethrough and extending into both of said half portions from the contacting faces of the latter, each of said lower portions further comprising a cylindrical stud extending perpendicularly downwardly therefrom directly below said recess and further being formed with a slot extending through said stud and connecting said recess to the lower outside surface of said stud, each of said upper portions being formed with a recess coincident with said stud and into which a stud of an identical casing may extend when said casings are stacked, and each of said portions of a casing being formed with a hole for a connecting screw passing freely through the two portions, the screw holes of the portions of a casing being coincident, and mating male and female conductors loosely resting in the respective recesses of the casings of the connector and having mating contact portions, the male contact portion further extending forwardly from its casing and into electrical contact with the female contact, said conductor portions further having terminal portions extending out of said casings for connection to electrical leads, each of said casings further comprising means independent of said screw and fastening its upper and lower portions together.

2. In an electrical connector according to claim 1, one of said terminal portions extending through said slot in said stud and perpendicularly away from said casing.

3. In an electrical connector according to claim 1, each of said upper portions further being formed with a recess in its upper surface surrounding said connecting screw hole, said connecting screw further having a head seated in said recess, said upper portion further comprising a sleeve extending downwardly therefrom and concentrically surrounding said screw hole, and each of said lower portions being formed on its upper surface with a recess receiving said sleeve, said sleeve further insulating said connecting screw from said conductor.

4. An insulating casing for an electrical connector, said casing comprising upper and lower half portions, said half portions being of height, length and width substantially equal one to the other, and said half portions further comprising interengaging means cooperating to provide registry of said portions when the upper is placed in contact on the lower, said casing further being formed with an elongated conductor retaining recess extending laterally into both of said portions from the contacting faces thereof, said recess further extending between opposite end faces of said casing and providing at the front end of said casing space for alternatively a female or male electrical contact and at the rear end an opening through which a terminal portion of said electrical contact may extend in prolongation of the length of said contact retaining recess, said lower half portion further comprising a stud extending downwardly therefrom and located below said recess, and said upper half portion being formed with a recess located to receive a stud of a lower portion of an identical casing in stacked relation, one of said half portions further being formed with a slot aligned with said stud and through which a terminal portion of said electrical contact may alternatively extend substantially perpendicularly to the length of said contact retaining recess, said casing further comprising means extending transversely of and fastening said half portions together and cooperating with said interengaging means to provide registry of said portions.

5. An insulating casing according to claim 4, said half portions further being formed with aligned holes for an attaching screw, said top portion further being formed with a concentric recess for the head of said screw, and said interengaging means being a sleeve concentric with said screw hole and extending downwardly from said top portion and a complementary recess formed in said lower portion and receiving said sleeve, said attaching screw and said stud further cooperating to position said casing on a support.

References Cited in the file of this patent

UNITED STATES PATENTS

| | | |
|---|---|---|
| 1,530,011 | Pacent | Mar. 17, 1925 |
| 1,662,335 | Reichold | Mar. 13, 1928 |
| 2,068,486 | Gilbert | Jan. 19, 1937 |
| 2,326,327 | Brewer | Aug. 10, 1943 |
| 2,377,187 | Schey | May 29, 1945 |
| 2,397,102 | Graham | Mar. 26, 1946 |
| 2,431,999 | Engelhardt | Dec. 2, 1947 |
| 2,433,358 | Garberding | Dec. 30, 1947 |
| 2,438,371 | Marholz | Mar. 23, 1948 |
| 2,443,797 | Miller | June 22, 1948 |
| 2,469,397 | Mezek | May 10, 1949 |
| 2,492,616 | Bohnson | Dec. 27, 1949 |
| 2,610,998 | Lockhart | Sept. 16, 1952 |